United States Patent [19]

Jones

[11] 4,335,539

[45] Jun. 22, 1982

[54] GAME CALL

[76] Inventor: Harold G. Jones, 10027 Cayuse La., Boise, Id. 83703

[21] Appl. No.: 255,699

[22] Filed: Apr. 20, 1981

[51] Int. Cl.³ .............................................. A63H 5/00
[52] U.S. Cl. ........................................ 46/179; 84/330
[58] Field of Search ................. 46/179, 178, 180, 181; 84/93, 330; 116/137 R

[56] References Cited

U.S. PATENT DOCUMENTS

| | | | |
|---|---|---|---|
| 704,233 | 7/1902 | Brown | 46/181 |
| 2,242,912 | 5/1941 | Healy | 84/330 X |
| 4,034,499 | 7/1977 | Wild | 46/178 X |

*Primary Examiner*—Paul J. Hirsch
*Assistant Examiner*—Mickey Yu
*Attorney, Agent, or Firm*—Paul F. Horton

[57] ABSTRACT

A game call, operable to simulate an elk call, including a whistle having a longitudinal bore and a top vent and provided with a mouthpiece and a hollow open-ended tube of flexible material in fluid communication with the bore of the whistle. The flexible tube is preferably attached to the whistle by means of an adapter which is mateable with a second adapter attached to the free end of the flexible tube to protectively enclose the whistle. The two adapters, when mated, form a convenient handle for carrying. The flexible tube is provided with a spiraled inwardly projecting rib and is of sufficient resiliency to be doubled back upon itself in substantial O-shaped configuration for varying pitch during operation and for convenient portability.

3 Claims, 3 Drawing Figures

GAME CALL

BACKGROUND OF THE INVENTION

1. Field of the Invention

This invention relates, in general, to game calls and, in particular, to elk calls.

2. Description of the Prior Art

The desirability of game calls for luring wild game into a certain position has long been recognized by the sportsman. To be effective, the game call must, first of all, bear close resemblance to the sound of the animal being lured. In this respect, where the sound of a single elk call varies considerably in magnitude and pitch, it is essential that the operator of the game call have careful control over the elements varying these parameters. Secondly, the call should be useable on short notice and with minimum preparation. Thirdly, where calls are to be used in the wild, the operating parts should be kept free of contaminants. Particularly is this true where the mouth is to engage the instrument. Fourthly, the device must be conveniently portable. Game calls of the prior art include the bellows-diaphragm call of F. R. Piper, U.S. Pat. No. 3,968,592 and the whistle call of M. Saso, U.S. Pat. No. 4,207,703.

SUMMARY OF THE INVENTION

The present invention comprises a whistle portion communicating with a hollow-flexible-open ended tube which is adapted for manual contortion. Intensity of the sound is controlled through the whistle and pitch of the sound is varied by the manual contortion of the flexible tube. Adapters are provided for closing the tube to protect the working parts while simultaneously serving as a handle.

It is therefore a primary object of the present invention to provide an elk call which closely simulates the sound of elk.

More specifically, it is an object of the present invention to produce the sound of elk by means of an orally controlled whistle and a manually manipulated flexible tubing in fluid communication with the whistle.

Another object of the present invention is to provide a game call which may be readily manipulated to form a protective handle to prevent contamination of active parts.

Additional objects and advantages will become apparent and a more thorough and comprehensive understanding may be had from the following description taken in conjunction with the accompanying drawings forming a part of this specification.

DETAILED DESCRIPTION

Figure 1:
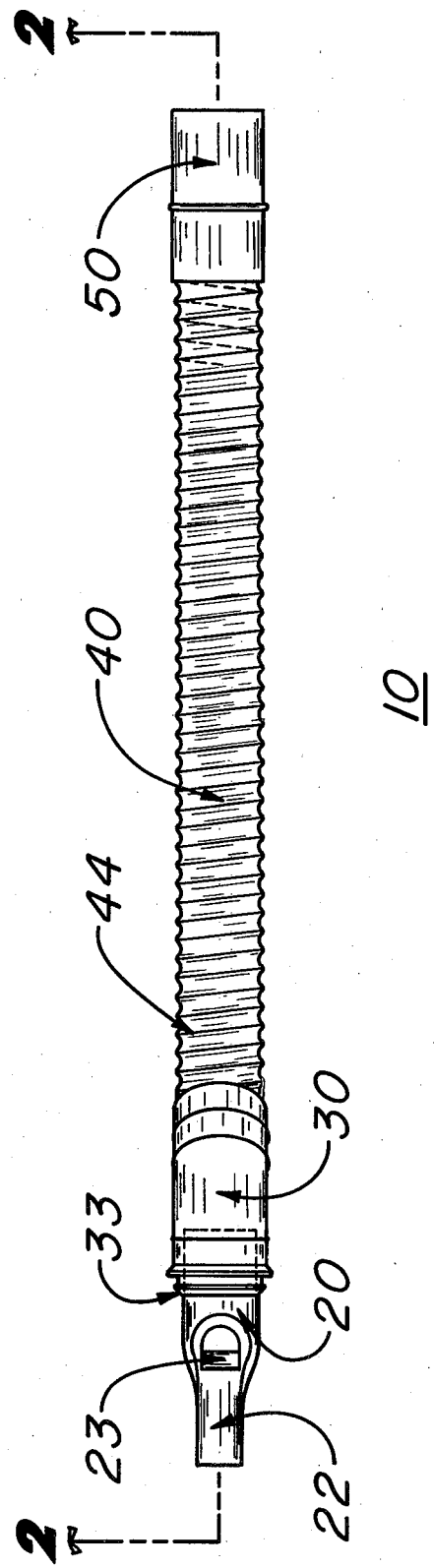
FIG. 1 is a plan view of one embodiment of the present invention shown in the open or operating position.

As shown in the figures, game call 10 of the present invention includes, in the preferred embodiment, a whistle 20; a whistle adapter 30; a flexible tube 40; and a second adapter 50.

Whistle 20 is provided with a mouthpiece 22 which defines at least one longitudinal duct 25 which extends the length of the whistle and is open at opposing ends. As is conventional, the whistle is also provided with one or more top positioned air vents 23 communicating with each duct 25. A variety of whistles meeting the above criteria have been used as a component of the game call 10 of the present invention and all have been found workable. A whistle manufactured under the trademark "Trophy" has been used with great success.

Figure 2:
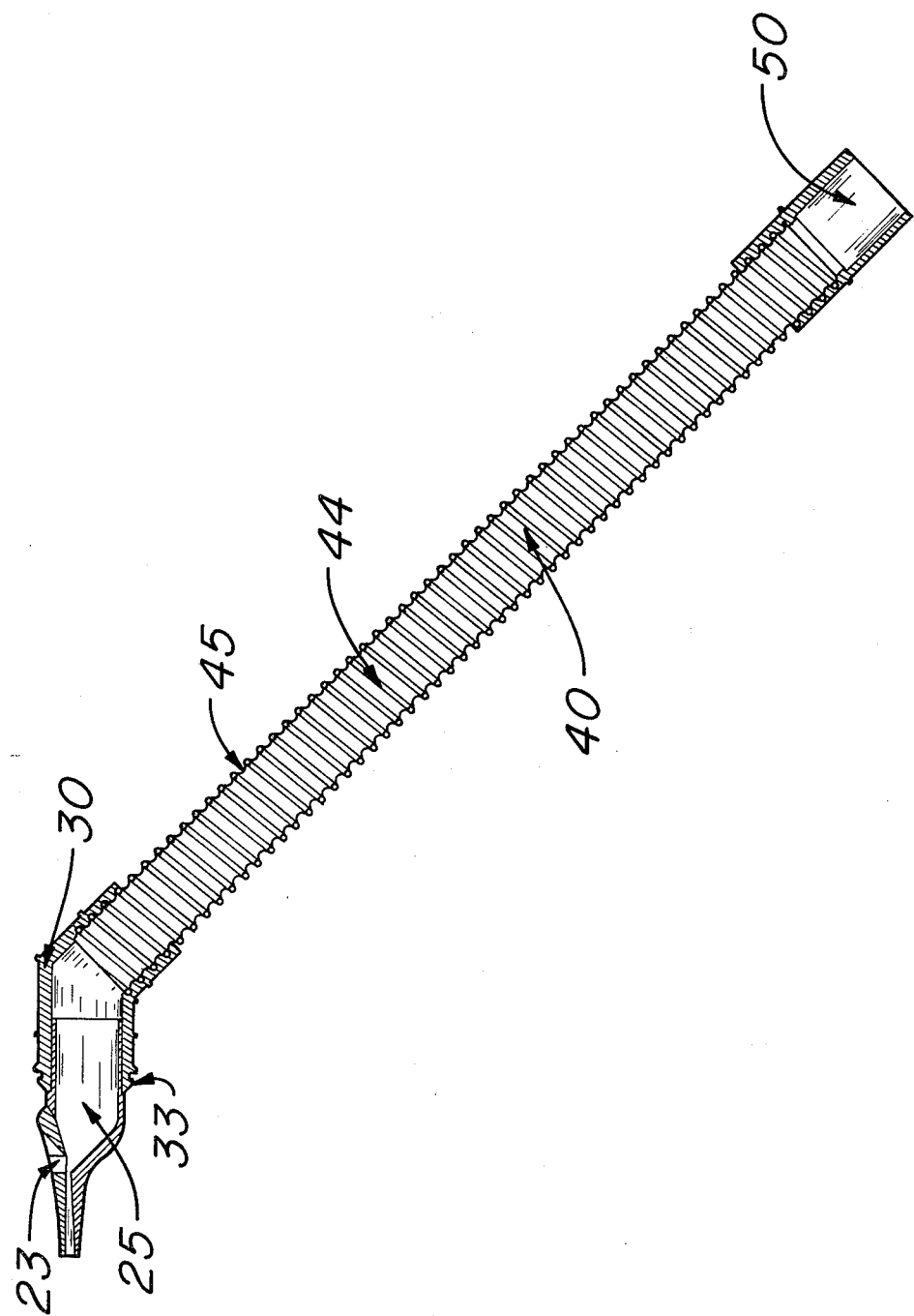
FIG. 2 is a sectional view of the apparatus of FIG. 1 along lines 2—2.

Whistle 20 is attached to flexible tube 40 by means of a whistle adapter designated herein as first adapter 30. The first adapter is made of a semi-rigid substance such as hard rubber and is preferably of a modified V configuration as shown to advantage in FIGS. 2 and 3. Adapter 30 is tubular in construction and carries on its outer surface a raised annular protuberance 33 which is adapted to engage the internal surface of second adapter 50 as will hereinafter be described.

Tube 40 is preferably 15 inches in length, having an inside diameter of 1 inch. The tube is made of a flexible material such as polyethylene and is provided with a metallic spring-like spiral member 44 extending the entire length of the tube. The spiralling metal defines one continuous inwardly projecting spiraled rib 45 extending the length of the tube. The height of the rib is approximately ⅛ inch from crest to trough.

Figure 3:
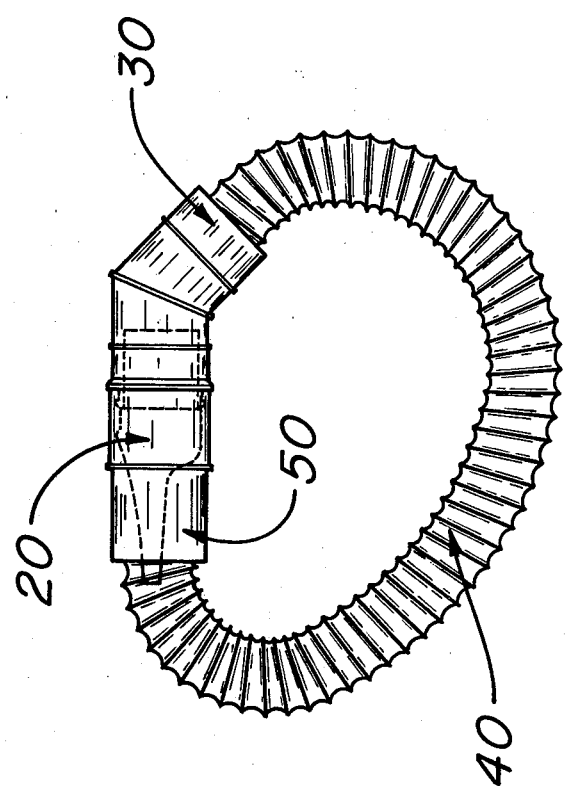
FIG. 3 is a side view of the apparatus of FIG. 1 shown in the closed position.

At the free end of tube 40, a second adapter, designated by the numeral 50, is attached. The second adapter is approximately 2 inches in length, making the overall length of game call 10, from tip of mouthpiece 22 to the end of second adapter 50, approximately 23 inches in length. Adapter 50 is semi-rigid and, like the first adapter, is preferably made of rubber, plastic, or the like. The second adapter comprises a hollow tube engageable with protuberance 33 of adapter 30 to hold the adapters in a closed locked position when adapter 50 is slipped over whistle 20. In the closed position, as shown in FIG. 3, it will be seen that the mouthpiece of the whistle is completely covered and protected from contamination. Additionally the adapters, in the closed position provide a convenient handle for carrying the game call which is in a compact substantially circular configuration.

For operation, and assuming the game call is in a closed position, the user simply pulls one adapter from the other, thereby freeing protuberance 33 of adapter 30 from adapter 50, and the game call is then in the extended position as shown in FIG. 1. The user then blows through the mouthpiece of whistle 20 with a controlled intensity, orally varying the intensity as desired.

The user simultaneously covers the free terminal opening of second adapter 50 to a selected degree with his fingers. By skilled manipulation and contortion of flexible tube 40 as from the straight configuration of a bugle to a french horn circular configuration, an uncanny simulation of the elk call may be obtained. The calling or bugling of an elk usually includes a very high screech or bugling sound lasting approximately 3 or 4 seconds, followed by a lowering of pitch with a wider range of tones, and often a series of closely spaced very low pitched, undulating bawling sounds. This sound is simulated by the game call of the present invention by placing flexible tube 40 in an extended position and strongly blowing through the whistle for 3 to 4 seconds. With continued blowing force, tube 40 is slowly contorted into the circular shape of the french horn which lowers the overall pitch but increases the frequency range. This maneuver is followed by a lowering of the blowing force resulting in an even lower pitch and repetitive partial covering of the end of adapter 50 by the fingers giving an undulating low pitched sound completing the call. Once the elk approaches, the blowing intensity is lessened and the same maneuvers performed giving the impression that the call is at a greater distance than it is.

While the effect of the spiral rib 45 of flexible tube 40 is not well understood, it is believed that the ribs act as baffles on the rushing air producing an audible resonance. The spiral structure is believed to cause a softening of the resonant beat.

Having thus described in detail a preferred embodiment of the present invention, it is to be appreciated and will be apparent to those skilled in the art that other physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A game call comprising a whistle having an upper vent opening to the atmosphere, a longitudinally extending air chamber, and a mouthpiece for the oral introduction of air for the controlled production of sound;
   a first adapter operable to engage said whistle at an opposing end from said mouthpiece, said adapter defining a hollow tube in fluid communication with said whistle;
   a hollow, flexible open-ended tube attached to said first adapter at the end opposite said whistle and in fluid communication with the hollow tube of said adapter, said flexible tube being of sufficient length and resiliency to be doubled back upon itself in a substantially O-shaped configuration; and
   a second adapter connected to said flexible tube at an end opposite said first adapter, said second adapter defining a hollow tube in fluid communication with said flexible tube and said second adapter operable to protectingly receive said whistle and adapted to matingly engage said first adapter in a closed position to form a carrying handle therewith.

2. The apparatus as described in claim 1 wherein said hollow flexible tube is provided with an inwardly projecting spiraled rib extending the substantial length of said tube.

3. A game call comprising:
   a whistle including a housing forming at least one longitudinally extending air chamber; at least one vent formed in the top of the housing in fluid communication with a respective air chamber; and a mouthpiece at the front of the housing, said mouthpiece provided with at least one hollow tube, each hollow tube in fluid communication with a respective air chamber for the controlled oral introduction of air for the production of sound;
   a hollow, flexible, open ended tube connected at one end to said whistle, said tube adapted for selected manual contortion whereby sounds of varying pitch may be produced; and
   a whistle cover carried upon the free open end of said flexible tube, said whistle cover adapted to securely engage said whistle and to protectively cover the mouthpiece thereof.

* * * * *